US012612535B2

(12) United States Patent
Shiozaki

(10) Patent No.: US 12,612,535 B2
(45) Date of Patent: Apr. 28, 2026

(54) MAT MATERIAL, METHOD OF MANUFACTURING SAME, INORGANIC ADHESIVE SHEET, POLLUTION CONTROL DEVICE, AND THERMAL INSULATION

(71) Applicant: 3M INNOVATIVE PROPERTIES COMPANY, St. Paul, MN (US)

(72) Inventor: Kazuyoshi Shiozaki, Kanagawa pref. (JP)

(73) Assignee: 3M Innovative Properties Company, St. Paul, MN (US)

( * ) Notice: Subject to any disclaimer, the term of this patent is extended or adjusted under 35 U.S.C. 154(b) by 1367 days.

(21) Appl. No.: 17/296,569

(22) PCT Filed: Nov. 27, 2019

(86) PCT No.: PCT/IB2019/060227
§ 371 (c)(1),
(2) Date: May 25, 2021

(87) PCT Pub. No.: WO2020/110026
PCT Pub. Date: Jun. 4, 2020

(65) Prior Publication Data
US 2021/0388238 A1      Dec. 16, 2021

(30) Foreign Application Priority Data

Nov. 30, 2018      (JP) .............................. JP2018-225433

(51) Int. Cl.
| | |
|---|---|
| *B32B 7/04* | (2019.01) |
| *B01D 53/94* | (2006.01) |
| *B32B 15/14* | (2006.01) |
| *B32B 29/00* | (2006.01) |
| *C09J 7/21* | (2018.01) |
| *C09J 7/35* | (2018.01) |

(52) U.S. Cl.
CPC ................ *C09J 7/21* (2018.01); *B01D 53/94* (2013.01); *C09J 7/35* (2018.01); *C09J 2203/354* (2020.08); *C09J 2301/304* (2020.08); *C09J 2400/14* (2013.01); *C09J 2400/263* (2013.01); *C09J 2400/283* (2013.01)

(58) Field of Classification Search
CPC .......... B32B 7/04; B32B 15/14; B32B 29/00; B32B 2255/02; B32B 2255/12; B32B 2255/20; B32B 2260/021; B32B 2260/028
See application file for complete search history.

(56) References Cited

U.S. PATENT DOCUMENTS

| | | | | |
|---|---|---|---|---|
| 3,959,183 | A * | 5/1976 | Gospodar | ............. F01N 3/2846 |
| | | | | 422/177 |
| 6,051,193 | A | 4/2000 | Langer | |
| 7,854,905 | B2 | 12/2010 | Yasuda | |
| 9,670,814 | B2 | 6/2017 | Sako | |
| 10,533,476 | B2 | 1/2020 | Sako | |
| 2002/0025904 | A1 | 2/2002 | Goto | |
| 2009/0049831 | A1 | 2/2009 | Yasuda | |
| 2009/0304560 | A1 * | 12/2009 | Dietz | ........................ B32B 7/12 |
| | | | | 428/323 |
| 2010/0186359 | A1 * | 7/2010 | Dietz | .................... F01N 3/2853 |
| | | | | 428/221 |
| 2013/0118138 | A1 | 5/2013 | Kumano | |
| 2013/0255209 | A1 | 10/2013 | Okabe | |

FOREIGN PATENT DOCUMENTS

| | | |
|---|---|---|
| JP | S57-061686 | 4/1982 |
| JP | 2009-539031 A | 11/2009 |
| JP | 2017-210815 | 11/2017 |
| WO | WO 2004-061279 | 7/2004 |
| WO | WO 2007-030410 | 3/2007 |

OTHER PUBLICATIONS

International Search Report for PCT International Application No. PCT/IB2019/060227, mailed on Feb. 13, 2020, 4 pages.

* cited by examiner

*Primary Examiner* — Randy Boyer
(74) *Attorney, Agent, or Firm* — Carlos M. Téllez Rodríguez; 3M Innovative Properties Co

(57)      ABSTRACT

A mat material having excellent holding power that is applied to a device or a structure used in a heated environment, and a pollution control device including the mat material. The holding material includes a mat-shaped main body having a first surface and a second surface, and an inorganic adhesive sheet disposed on at least one surface of the first and second surfaces of the main body, and includes an inorganic adhesive that exhibits adhesiveness when heated. The pollution control device includes a casing, a pollution control element disposed within the casing, and the mat material disposed between the casing and the pollution control element.

11 Claims, 4 Drawing Sheets

MAT MATERIAL, METHOD OF MANUFACTURING SAME, INORGANIC ADHESIVE SHEET, POLLUTION CONTROL DEVICE, AND THERMAL INSULATION

CROSS REFERENCE TO RELATED APPLICATIONS

This application is a national stage filing under 35 U.S.C. 371 of PCT/IB2019/060227, filed Nov. 27, 2019, which claims the benefit of Japan Application No. 2018-225433, filed Nov. 30, 2018, the disclosures of which are incorporated by reference in their entireties herein.

TECHNICAL FIELD

The present disclosure relates to a mat material and a method of manufacturing the same, and an inorganic adhesive sheet, a pollution control device, and a thermal insulation structure.

BACKGROUND

Exhaust gas from an automobile engine includes carbon monoxide (CO), hydrocarbon (HC), nitrogen oxide (NOx), and the like. Exhaust gases discharged from a diesel engine also include particulate matters such as soot. As means for removing these, an exhaust gas cleaning system using a ceramic catalytic converter or a diesel particulate filter (DPF) is known. Furthermore, installation of a gasoline particulate filter (GPF) has also been studied. These devices are commonly referred to as pollution control devices.

In general, a pollution control device (for example, a ceramic catalytic converter) includes a pollution control element (for example, a honeycomb-shaped ceramic catalyst support), a metal casing that houses the pollution control element, and a holding material that fills a gap between an outer peripheral surface of the pollution control element and an inner surface of the casing. The holding material prevents movement and destruction of the pollution control element within the casing and provides a desirable effect in the operation lifetime of the pollution control element. The holding material of this type may be referred to as a mat material, a mounting material, or a mat mount material. These holding materials are normally in the form of a mat made of a single layer or a plurality of layers, and are used by winding around a pollution control element. In usual cases, the materials composing the holding material are mainly inorganic materials such as inorganic fiber from the perspective of achieving excellent heat insulation and heat resistance. Examples of holding materials (mounting materials) can be found in the patent documents JP 57-61686 A, JP 2002-66331 A, and JP 2006-223920 A.

SUMMARY OF INVENTION

Prior art holding materials have been devised so that positional displacement does not occur during use mainly due to the pressure contact force or frictional force. In other words, a technique for sufficiently holding a holding material, which has been housed in a casing together with a pollution control element, by pressing it against the surface of the other member (inner surface of a casing and/or an outer surface of a pollution control element) with which the holding material contacts, thereby preventing the pollution control element from moving from a predetermined position in the casing.

The present disclosure provides a mat material having an excellent holding power and being applied to a device or structure used in a heated environment, a method for manufacturing the mat material, an inorganic adhesive sheet, a pollution control device, and a thermal insulation structure.

One aspect of the present disclosure relates to a mat material. The mat material includes a mat-shaped main body having a first surface and a second surface, and an inorganic adhesive sheet that is disposed on at least one surface of the first and second surfaces of the main body, and includes an inorganic adhesive that exhibits adhesiveness when heated. One aspect of the present disclosure relates to an inorganic adhesive sheet. The inorganic adhesive sheet is used for fixing a pollution control element in a pollution control device, and includes an inorganic adhesive that exhibits adhesiveness when heated.

Another aspect of the present disclosure relates to a pollution control device. This pollution control device includes a casing, a pollution control element disposed within the casing, and the above-described mat material disposed between the casing and the pollution control element. One aspect of the present disclosure relates to a thermal insulation structure. The thermal insulation structure includes a first member having a surface that can be a temperature of 200° C. or higher, a second member having a surface facing the surface of the first member, and the above-described mat material disposed between the first member and the second member.

An additional aspect according to the present disclosure relates to a method for manufacturing a mat material. A first aspect of the method for manufacturing a mat material includes a step of preparing a mat-shaped main body having a first surface and a second surface, and a step of disposing an inorganic adhesive sheet on at least one surface of the first and second surfaces of the main body. A second aspect of the method for manufacturing a mat material includes a step of preparing a laminate including a mat-shaped member containing an inorganic fiber, and an inorganic adhesive sheet disposed on at least one surface of the mat-shaped member, and a step of die-cutting the laminate.

The present disclosure provides a mat material that has an excellent holding power and is applied to a device or a structure used in a heated environment, a method for manufacturing the mat material, an inorganic adhesive sheet and a pollution control device.

DESCRIPTION OF EMBODIMENTS

The mat material according to the present embodiment includes a mat-shaped main body having a first surface and a second surface, and an inorganic adhesive sheet disposed on at least one surface of the first and second surfaces of the main body. The inorganic adhesive sheet according to the present embodiment is a flexible sheet material, and includes an inorganic adhesive that exhibits adhesiveness by heating. By applying the mat material to a device or structure used in a heated environment, displacement of the mat material or other member in contact with it during use can be suppressed due to the adhesive effect of the inorganic adhesive.

By providing the inorganic adhesive material in the form of an inorganic adhesive sheet, the inorganic adhesive sheet alone can be handled independently of the main body of the mat material. As a result, by disposing the inorganic adhesive sheet of the present embodiment on an existing mat material, it can be used as the mat material of the present embodiment. Alternatively, the inorganic adhesive sheet may be combined with a thermal insulation member different from the mat material. If the adhesive material is directly applied to the mat material, the mat material may be impregnated with the adhesive, and its winding property may be impaired. By providing an inorganic adhesive in the form of an inorganic adhesive sheet, the active components of the adhesive can be uniformly localized on the surface of the mat material.

The mat material according to the present embodiment is applied to a device such as a pollution control device and a thermal insulation structure. A pollution control device according to one aspect of the present disclosure includes a casing, a pollution control element disposed within the casing, and the above-described mat material disposed between the casing and the pollution control element. The thermal insulation structure includes a first member having a surface that can be a temperature of 200° C. or higher, a second member having a surface facing the surface of the first member, and the mat material disposed between the first member and the second member. Detailed description of embodiments of the present disclosure will be given below with reference to the drawings.

Figure 1:
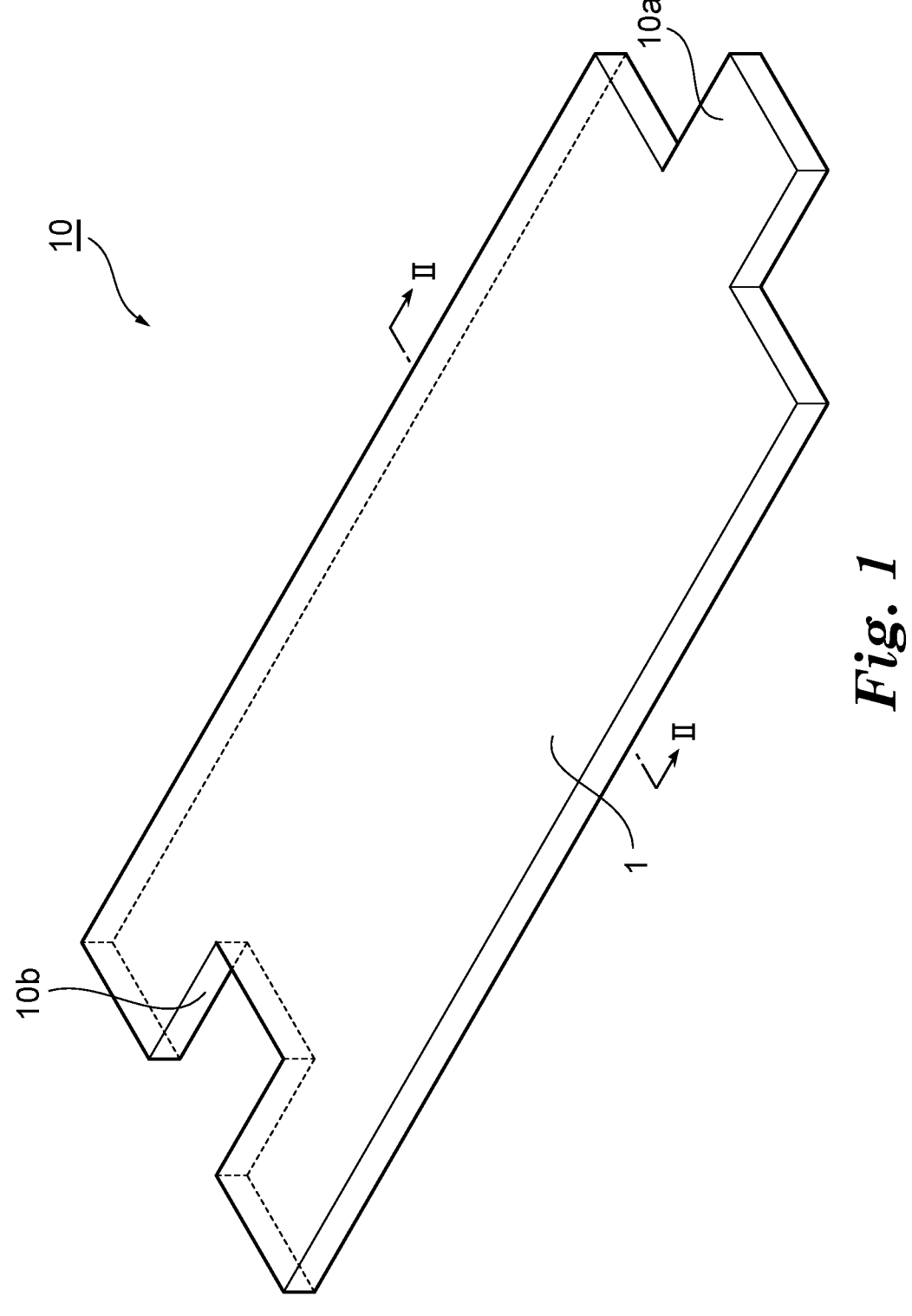
FIG. 1 is a perspective view illustrating an embodiment of a mat material according to the present disclosure.
Figure 4:
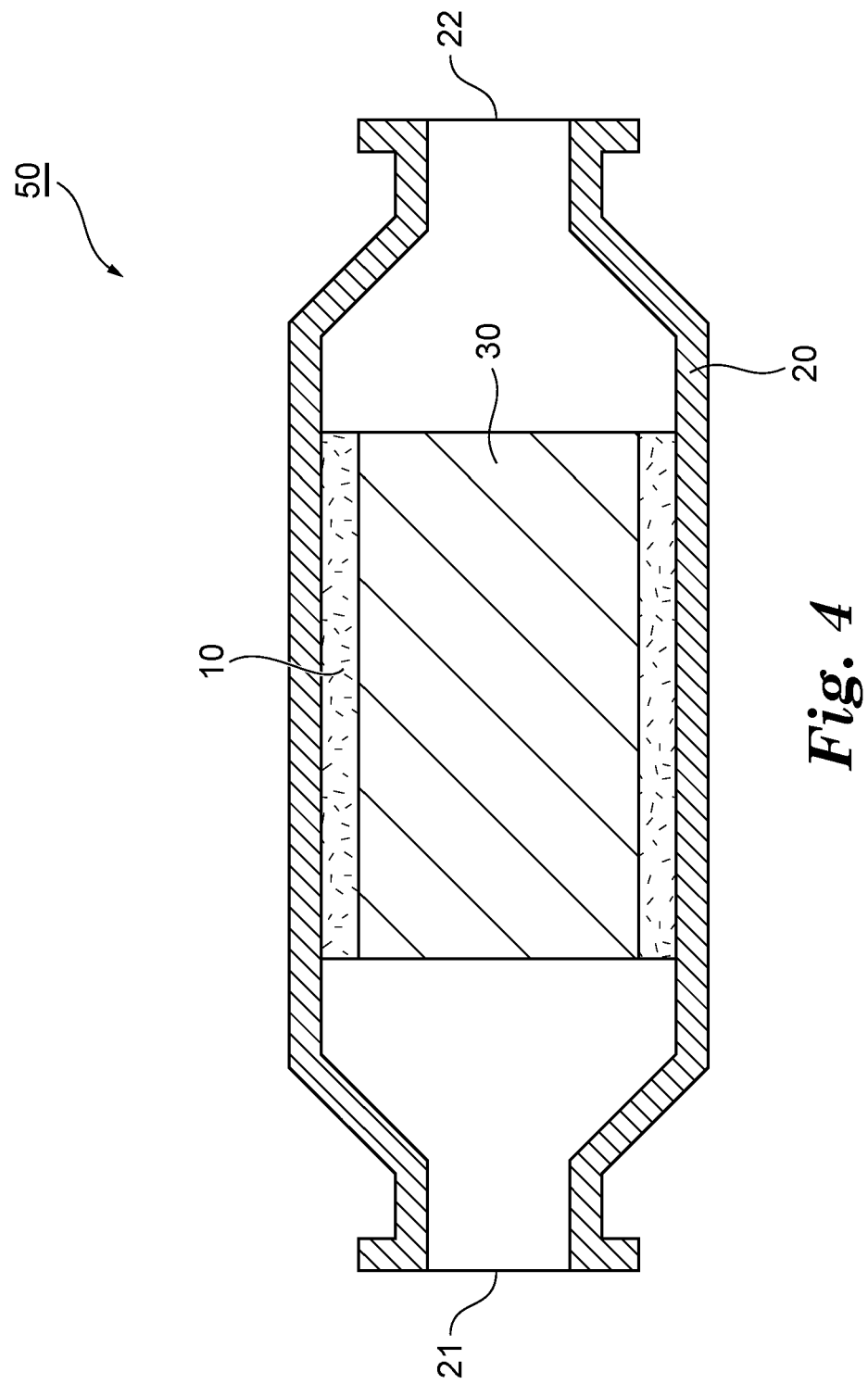
FIG. 4 is a schematic cross-sectional view illustrating an embodiment of a pollution control device according to the present disclosure.
Figure 5:
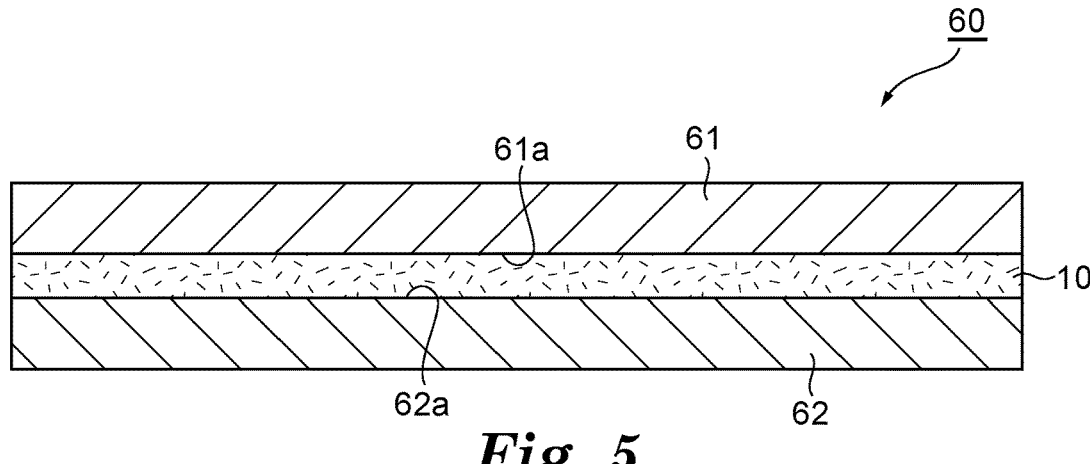
FIG. 5 is a schematic cross-sectional view illustrating an example of a thermal insulation structure to which the mat material according to the present disclosure has been applied.

FIG. 1 is a perspective view illustrating an example of the mat material of the present embodiment. The mat material 10 illustrated in the figure is for winding around a pollution control element 30 having a shape of a cylinder or elliptical column and holding the pollution control element 30 in a casing 20 (see FIG. 4). The mat material 10 has a length corresponding to a length of an outer periphery of the pollution control element 30. The mat material 10 includes, for example, a convex portion 10a at one end and a concave portion 10b at the other end, is formed in a shape such that the convex portion 10a and the concave portion 10b mate with each other when the mat material 10 is wound around the pollution control element 30. Note that the shape and the like of the mating are not particularly limited, and other forms such as an L-shape can be used.

Figure 2:
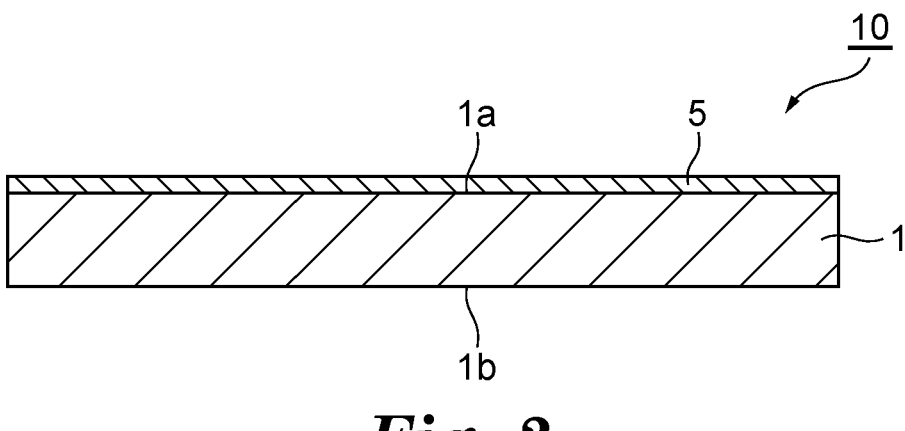
FIG. 2 is a schematic cross-sectional view along line II-II in FIG. 1.

As illustrated in FIG. 2, the mat material 10 includes a mat-shaped main body 1 and an inorganic adhesive sheet 5 laminated on the main body 1. The thickness of the main body 1 is, for example, about 5 to about 15 mm. The main body 1 is composed of, for example, an inorganic fiber having a diameter (average diameter) of about 3 to about 10 μm, and other optional components. The main body 1 has a first surface 1a and a second surface 1b. An inorganic adhesive sheet 5 is disposed on the first surface 1a of the main body 1. The inorganic adhesive sheet 5 of the present embodiment is disposed on the side in contact with the pollution control element 30 (see FIG. 4).

The inorganic adhesive sheet 5 may be disposed on both the first surface 1a and the second surface 1b, or may be disposed on only the second surface 1b. The inorganic adhesive sheet 5 may be disposed so as to cover the entire surface of the first surface 1a and/or the second surface 1b, or may be disposed so as to cover a portion of the inorganic adhesive sheet 5 as long as sufficient holding power is exhibited. When the inorganic adhesive sheet 5 is disposed on the side contacting the casing 20, particles such as glass bubbles, plastic bubbles, and shirasu soil may be attached to the surface of the inorganic adhesive sheet 5. Since the particles adhere to the surface of the inorganic adhesive sheet 5, the pollution control element 30 wounded by the mat material is easily pressed into the casing 20.

Figure 3A:
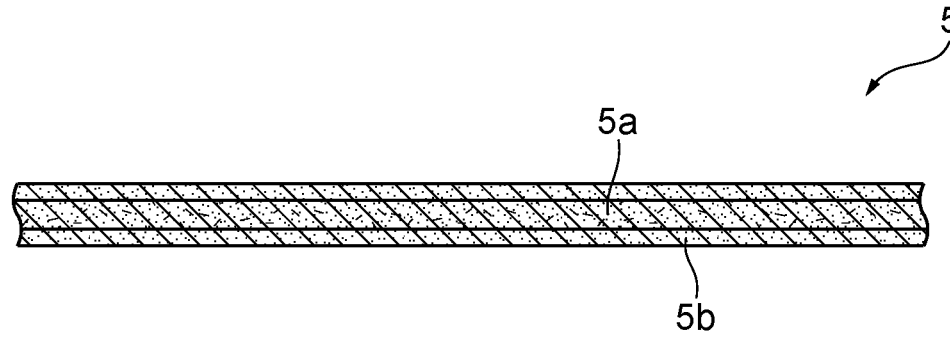
FIGS. 3A and 3B are schematic cross-sectional views illustrating embodiments of the inorganic adhesive sheet according to the present disclosure.
Figure 3B:
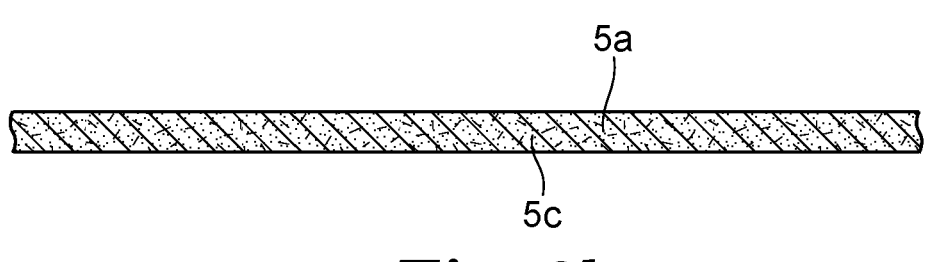

The inorganic adhesive sheet 5 is composed of a substrate 5a and an inorganic adhesive layer 5b. The substrate 5a supports the inorganic adhesive layer 5b. For example, as illustrated in FIG. 3A, in the inorganic adhesive sheet 5, the substrate 5a is embedded in the inorganic adhesive layer 5b, and there may be a portion where the inorganic adhesive layer 5b exists alone. In the inorganic adhesive sheet, the inorganic adhesive layer 5b may not exist alone, and as illustrated in FIG. 3B, the inorganic adhesive sheet may be in a form in which the substrate 5a is impregnated with the inorganic adhesive 5c.

The substrate 5a is, for example, a nonwoven fabric, paper, woven fabric, or a resin film. When the substrate 5a is a nonwoven fabric, paper, or woven fabric, the inorganic adhesive sheet 5 can be obtained by impregnating the substrate 5a with an inorganic adhesive. When the substrate 5a is a resin film, the inorganic adhesive sheet can be obtained by forming the inorganic adhesive layer 5b on at least one side of the resin film. In this case, the inorganic adhesive layer 5b is formed from, for example, a coating layer formed by coating. Examples of the material of the nonwoven fabric, woven fabric, and resin film include PET (polyethylene terephthalate), PP (polypropylene), and PE (polyethylene). Examples of paper include pulp, rayon, and glass fiber paper. The substrate 5a may be net-shaped. In this case, an inorganic adhesive sheet is composed of a net-shaped substrate and an inorganic adhesive adhered to the surface thereof. Examples of the net-shaped substrate include woven fabrics, knitted fabrics, and nonwoven fabrics, regardless of a construction method. The use of the net-shaped substrate can impart softness to the inorganic adhesive sheet. Additionally, the inorganic adhesive sheet may be cut. This can further impart flexibility.

The mass per unit area of the substrate 5a may be, for example, from 1 to 200 g/m², and the lower limit thereof may be 10 g/m² or 50 g/m², and the upper limit may be 150 g/m² or 100 g/m². When the mass per unit area of the substrate 5a is 1 g/m² or more, the substrate 5a can sufficiently fulfill the role of supporting the inorganic adhesive layer 5b. On the other hand, when the mass is 200 g/m² or more, moderate flexibility can be ensured and disappearance occurs in a relatively short period of time by thermal decomposition or the like. When the inorganic adhesive layer 5b itself is capable of retaining the shape of a sheet and has suitable flexibility, the inorganic adhesive sheet 5 may not include the substrate 5a. For example, a sheet may be formed by mixing a filler (fiber, beads, or the like) into the inorganic adhesive, and forming the mixture into a film.

The inorganic adhesive layer 5b contains an inorganic adhesive that exhibits adhesiveness when heated, and other component added as necessary. The inorganic adhesive not only includes the inorganic adhesive that adheres due to a product formation reaction with other members by heating, but also the inorganic adhesive that exhibits fluidity by heating, penetrates into a surface of the other member which is a contact surface, and generates adhesion by an anchoring effect (anchoring state). Although the temperature at which the adhesiveness is expressed is not limited, the adhesiveness may be expressed at a temperature of, for example, 200° C. or greater, or 300° C. or greater, or 600° C. or greater. For example, when the mat material 10 is placed in a state interposed between two members, and after the mat material 10 is left under a temperature condition of 600° C. for one hour, the mat material 10 exhibits adhesiveness to other members. In some cases, exhibition of adhesiveness can be visually determined based on whether or not a fixed region is formed between the mat material 10 and other member after cooling the heated mat material.

The inorganic adhesive sheet 5 in the present embodiment may be virtually dry while being liquid at room temperature. Note that "virtually dry" means, for example, the reduction ratio based on the mass of the inorganic adhesive sheet 5 before heating is within 5% after heating the inorganic adhesive sheet 5 at 120° C. for 30 minutes. When the inorganic adhesive sheet 5 is virtually dry, the mat material 10 has an advantage that it has excellent workability when assembled to a device. The inorganic adhesive layer 5b may include an appropriate amount of organic material (e.g., acrylic binder, polyvinyl alcohol (PVA), or an ethylene-vinyl acetate copolymer resin (EVA)) from the perspective of further improving the workability and improving the initial holding power. The inclusion of an organic material improves the slidability when the mat material is disposed in the pollution control device 50. In addition, the holding power around 200° C. Celsius.

Examples of the inorganic adhesive include at least one type of salt selected from the group consisting of alkali metal salts, alkaline earth metal salts, and phosphate salts. Specific examples of the alkali metal salts include alkali metal silicates such as sodium silicate, potassium silicate, and lithium silicate. Specific examples of the alkaline earth metal salts include alkaline earth metal silicates such as magnesium silicate and calcium silicate. Specific examples of phosphate salts include aluminum phosphate, magnesium phosphate, and calcium phosphate. One type of these components may be used alone, or two or more types thereof may be used in combination.

The inorganic adhesive sheet 5 can be obtained by impregnating the substrate 5a with a liquid containing the inorganic adhesive, followed by heat treatment. The content of the inorganic adhesive (salt described above) in the inorganic adhesive sheet 5 is, for example, from 2 to 100 $g/m^2$, and the lower limit thereof may be 5 $g/m^2$ or 8 $g/m^2$, and the upper limit thereof may be 50 $g/m^2$ or 30 $g/m^2$. The amount of the inorganic adhesive in the inorganic adhesive sheet 5 may be appropriately set according to the adhesiveness to other members required of the mat material 10.

The main body 1 is mainly composed of an inorganic fiber. Specific examples of the inorganic fiber composing the main body 1 include glass fibers, ceramic fibers, carbon fibers, silicon carbide fibers, and boron fibers, and other inorganic fibers may be used as necessary. One type of the inorganic fiber selected from the above may be used alone, or a combination of two or more types thereof may be used, or a composite fiber thereof may be used. Among these, particularly preferred are ceramic fibers such as alumina fibers, silica fibers, and alumina-silica fibers. The ceramic fibers may be used alone, or a combination of two or more types thereof may be used, or composite fibers thereof may be used.

The main body portion 1 is obtained by mixing inorganic fibers and an organic binder as starting materials with any additives, and then continuously performing the steps such as spreading the inorganic fibers, preparing a slurry, molding by papermaking, and mold pressing. WO 2004/061279 and U.S. Pat. No. 6,051,193 can be referred to for details of a wet method (wet lamination method). Note that the type of the organic binder and the amount of the organic binder used are not particularly limited. For example, acrylic resins, styrene-butadiene resins, acrylonitrile resins, polyurethane resins, natural rubbers, polyvinyl acetate resins, and the like provided in the form of latex can be used as the organic binder. Alternatively, a flexible thermoplastic resin such as an unsaturated polyester resin, an epoxy resin, and a polyvinyl ester resin may be used as the organic binder.

The main body 1 may have a surface layer (not illustrated). The surface layer may include inorganic colloidal particles such as inorganic particles composed of metal oxides, nitrides and carbides. Preferred examples of the metal oxide having heat resistance include silica, alumina, mullite, zirconia, magnesia, and titania. Examples of other preferred materials include boron nitride and boron carbide. These inorganic particles may be used alone, or in combination of two or more of them. The average particle size of the inorganic colloidal particles (inorganic particles) may be, for example, about 1 to 100 nm. When the average particle size is 1 nm or more, a friction layer that can contribute to the friction increasing effect can be formed, and when the average particle size is 100 nm or less, the friction layer that can contribute to the friction increasing effect can be formed and peeling off of the inorganic particles can be suppressed. The average particle size of the inorganic particles may be about 10 to 80 nm or about 20 to 50 nm. For the inorganic colloidal particles, reference can be made to WO 2007/030410.

The surface layer of the main body 1 may further contain an inorganic fiber as necessary. The diameter of the inorganic fiber may be, for example, about 1 nm to about 15 nm, and its lower limit may be about 1 nm, about 2 nm, or about 3 nm, and its upper limit may be about 15 nm, about 8 nm, or about 5 nm. An inorganic fiber having a diameter of about 1 nm or more have an advantage that it is easy to obtain compared to an inorganic fiber thinner than this. In addition, at the time of manufacturing a device such as a pollution control device, the fiber tends to suppress scattering of fiber fragments. On the other hand, an inorganic fiber having a diameter of about 15 nm or less tends to suppress the generation of fiber fragments during the manufacture of a device as compared with thicker inorganic fibers. The average length of the inorganic fiber may be, for example, about 500 to about 5000 nm, and may be about 1000 to about 4000 nm or about 1400 to about 3000 nm. The diameter (average diameter) and the average length (average fiber length) of the inorganic fiber can be determined by measuring the thickness and the length of randomly extracted fibers from, for example, 50 or more micrograph images (TEM image, SEM image, and the like), and calculating the average values of the thicknesses and the lengths. The aspect ratio of the inorganic fiber is calculated by dividing an average length value by a value of the diameter.

The aspect ratio of the inorganic fiber may be, for example, about 60 to about 2000, and may be about 100 to about 1500, or about 300 to about 800. An inorganic fiber having an aspect ratio of about 60 or greater tends to suppress scattering of fiber fragments as compared to an inorganic fiber having a smaller aspect ratio at the time of manufacturing a device. On the other hand, an inorganic fiber having an aspect ratio of about 2000 or less is more readily available as compared to an inorganic fiber having a larger aspect ratio. For the inorganic fiber, reference can be made to the specification of JP 2017-210815.

The method for manufacturing the mat material 10 according to the present embodiment includes a step of preparing the main body 1 and step of disposing the inorganic adhesive sheet 5 on at least one surface of the first surface 1*a* and the second surface 1*b* of the main body 1. According to the manufacturing method described above, a mat material 10 in which an inorganic adhesive sheet 5 of an arbitrary size is disposed on at least one surface of the main body 1 can be obtained. The manufacturing method for the mat material 10 may be the following embodiment. That is, the method for manufacturing the mat material 10 includes a step of preparing a laminate including a mat-shaped member containing an inorganic fiber and an inorganic adhesive sheet disposed on at least one surface of the mat-shaped member, and a step of die-cutting the laminate into the shape of the mat material 10. This manufacturing method is suitable, for example for manufacturing the mat material 10 by a roll-to-roll method.

The mat material 10 is used to hold the pollution control element 30 within a pollution control device 50 as illustrated in FIG. 4. Specific examples of the pollution control element 30 include a catalyst support, and a filter element for purifying exhaust gas from an engine. Specific examples of the pollution control device 50 include a catalytic converter and an exhaust cleaning device (for example, a diesel particulate filter device).

The pollution control device 50 illustrated in FIG. 4 includes the casing 20, the pollution control element 30 disposed within the casing 20, and the mat material 10 disposed between an inner surface of the casing 20 and an outer surface of the pollution control element 30. The pollution control device 50 further includes a gas inflow port 21 configured to introduce exhaust gas into the pollution control element 30, and a gas flow outlet 22 configured to discharge exhaust gas that has passed through the pollution control element 30.

In the pollution control device 50, the mat material 10 is disposed in a state interposed between the inner surface of the casing 20 and the outer surface of the pollution control element 30. The width of a gap between the inner surface of the casing 20 and the outer surface of the pollution control element 30 is preferably about 1.5 to about 15 mm from the perspective of ensuring hermeticity and reducing the usage of the mat material 10. The mat material 10 is preferably in a state of being appropriately compressed so that the mat material 10 can be fixed to other members that come into contact with the mat member 10 by heating. Since the mat material 10 is fixed to the inner surface of the casing 20 and the outer surface of the pollution control element 30, displacement of the pollution control element 30 in the pollution control device 50 can be highly suppressed. In addition, the bulk density at the time of assembly can be set lower than that of prior art, and the amount of a relatively expensive inorganic fiber material used can be reduced. Examples of the method for compressing and assembling the mat material 10 include a clamshell method, a stuffing method, and a tourniquet method.

The pollution control element 30 becomes hot when high temperature exhaust gas passes through the inside thereof. The space between the pollution control element 30 and the mat material 10 is heated to about 200 to 1100° C. On the other hand, the space between the mat material 10 and the casing 20 is heated to about 100 to 800° C. The pollution control device 50 includes a mat material 10 having an inorganic adhesive sheet 5 that exhibits adhesiveness when heated, and thus firmly holds the pollution control element 30 within the casing 20.

A catalyst to be supported on a catalyst support is typically a metal (for example, platinum, ruthenium, osmium, rhodium, iridium, nickel, palladium, and the like) and metal oxides (for example, vanadium pentoxide, titanium dioxide, and the like), and is preferably used in the form of a coating. Note that the pollution control device can be constructed as a diesel particulate filter or a gasoline particulate filter by applying the filter element in place of the catalyst support.

Detailed descriptions have been given above for the preferred embodiments of the present invention. However, the present invention is not limited to the embodiments described above. For example, in the embodiment described above, an example has been illustrated in which the mat material 10 is applied to a pollution control device, but the mat material 10 may be applied to a thermal insulation structure including an exhaust system such as an exhaust manifold or an exhaust pipe through which a heat source or a high temperature fluid flows, and a heat shield cover disposed around it. As shown briefly in FIG. 5, the thermal insulation structure 60 includes a first member 61 (e.g., an exhaust system part through which a heat source or hot fluid flows) having a surface 61 a that can be a temperature of 200° C. or higher, a second member 62 (e.g., a heat shield cover) having a surface 62*a* facing the surface 61*a* of the first member 61, and a mat material 10 disposed between the first member 61 and the second member 62. The inorganic adhesive of the mat material 10 exhibits adhesiveness by heat from the first member 61 that can be 200° C. or higher. Due to the adhesiveness of the inorganic adhesive, displacement of the mat material 10 in the thermal insulation structure 60 can be suppressed.

EXAMPLES

The present disclosure will be described with reference to examples of the present disclosure. Note that the present invention is not limited by these examples.

MANUFACTURE OF MAIN BODY

The following chemicals were added to 10 L of stirred 10 L water at intervals of 1 minute to prepare a colloidal solution containing an organic binder and inorganic fine particles.

(1) Aluminum sulfate (aqueous solution having solid content concentration of 40%): 6 g (2) Organic binder (acrylic latex, Nipol LX874 (trade name), manufactured by Zeon Corporation): 2.6 g (3) Colloidal silica (Snowtex O (trade name), manufactured by Nissan Chemical Corporation): 10 g (4) Sodium liquid aluminate (aqueous solution having solid content concentration of 40%): 3.5 g As the next step, a needle-punched alumina fiber blanket (manufactured by Mitsubishi Chemical Corporation, MAFTEC MLS-2 blanket (trade name)) was cut into 12 cm×40 cm. The blanket was then placed on a metal mesh, and after the colloidal solution was poured from above, the blanket was suctioned and dehydrated for 15 seconds on the metal mesh. After the blanket was impregnated with the above-described colloidal solution in this manner, the blanket was dried for 45 minutes in a hot air drier set to a temperature of 170° C. In this manner, the main body of the mat material was manufactured.

MANUFACTURE OF INORGANIC ADHESIVE SHEET

Aqueous Solution Containing Inorganic Adhesive (1) Aqueous solution 1: Sodium silicate (solid content concentration: 40 mass %) was diluted with water to prepare an aqueous solution having a solid content concentration of 22 mass %.
An aqueous solution diluted to 50% concentration was prepared.
(2) Aqueous solution 2: Potassium silicate (solid content concentration: 30 mass %) was diluted with water to prepare an aqueous solution having a solid content concentration of 22 mass %.
(3) Aqueous solution 3: Aluminum phosphate (Taki Alpha WR-100B, solid content concentration: 33 mass %, manufactured by Taki Chemical Co., Ltd.) was diluted with water to prepare an aqueous solution having a solid content concentration of 22 mass %.
(4) Aqueous solution 3: Aluminum phosphate (Taki Alpha WR-100B, solid content concentration: 33 mass %, manufactured by Taki Chemical Co., Ltd.) was diluted with water to prepare an aqueous solution having a solid content concentration of 22 mass %, and mixed with polyethylene oxide (Alcox E520, solid content concentration: 0.3 mass %, manufactured by Meisei Chemical Works, Ltd.).

Substrate (1) Substrate a: Nonwoven fabric (PET, MILIFE TY0505FE (trade name), 10 g/m$^2$, manufactured by JX Nippon ANCI, Inc.) was cut to 12 cm×40 cm.
(2) Substrate b: Paper (material: rayon, 14 g/m$^2$, manufactured by Nangoku Pulp Industries Co., Ltd.) was cut into 12 cm×40 cm.
(3) Substrate c: A net (material: polyethylene, WARIFU SS28L (trade name), 18 g/m$^2$, manufactured by JX Nippon ANCI, Inc.) was cut into 12 cm×40 cm.
(4) Substrate d: A woven fabric (material: cotton, gauze, 35 g/m2, manufactured by Endo Corporation) was cut into 12 cm×40 cm.
(5) Substrate e: A film (material: HDPE, 20 g/m2) was cut to 12 cm×40 cm.

MANUFACTURE OF MAT MATERIAL

Example 1

The substrate a was fixed with a pressure-sensitive adhesive tape on the surface of a paper liner subjected to water repellent treatment, and placed on a flat table. 3 g of aqueous solution 1 was then applied onto the substrate a by bar coating. The substrate a coated with the aqueous solution was applied was placed in an oven at a set temperature of 60° C. for 1 hour to dry the aqueous solution, thereby obtaining an inorganic adhesive sheet. The mat material according to the present example was obtained by disposing the inorganic adhesive sheet on one surface of the main body. The surface of the main body and the inorganic adhesive sheet were physically fixed by the roughness of the surfaces of each other without adhesive.

Example 2

An inorganic adhesive sheet was obtained in the same manner as in Example 1 except that the coating amount of the aqueous solution 1 was 6 g. The mat material according to the present example was obtained by disposing the inorganic adhesive sheet on one surface of the main body.

Example 3

An inorganic adhesive sheet was obtained in the same manner as in Example 1 except that the coating amount of the aqueous solution 1 was 12 g. The mat material according to the present example was obtained by disposing the inorganic adhesive sheet on one surface of the main body. Since 12 g of the aqueous solution could not be applied at once, a series of steps of performing drying treatment after applying 6 g of the aqueous solution 1 to the substrate a was repeated twice.

Example 4

An inorganic adhesive sheet was obtained in the same manner as in Example 1 except that the aqueous solution 2 was used in place of the aqueous solution 1. The mat material according to the present example was obtained by disposing the inorganic adhesive sheet on one surface of the main body.

Example 5

An inorganic adhesive sheet was obtained in the same manner as in Example 2 except that the aqueous solution 2 was used in place of the aqueous solution 1. The mat material according to the present example was obtained by disposing the inorganic adhesive sheet on one surface of the main body.

Example 6

An inorganic adhesive sheet was obtained in the same manner as in Example 3 except that the aqueous solution 2 was used in place of the aqueous solution 1. The mat material according to the present example was obtained by disposing the inorganic adhesive sheet on one surface of the main body.

Example 7

An inorganic adhesive sheet was obtained in the same manner as in Example 1 except that the substrate b was used in place of the substrate a. The mat material according to the present example was obtained by disposing the inorganic adhesive sheet on one surface of the main body.

Example 8

The inorganic adhesive sheet was obtained in the same manner as in Example 2 except that the substrate b was used in place of the substrate a. The mat material according to the present example was obtained by disposing the inorganic adhesive sheet on one surface of the main body.

Example 9

An inorganic adhesive sheet was obtained in the same manner as in Example 3 except that the substrate b was used in place of the substrate a. The mat material according to the present example was obtained by disposing the inorganic adhesive sheet on one surface of the main body.

Example 10

An inorganic adhesive sheet was obtained in the same manner as in Example 7 except that the aqueous solution 2 was used in place of the aqueous solution 1. The mat material according to the present example was obtained by disposing the inorganic adhesive sheet on one surface of the main body.

Example 11

An inorganic adhesive sheet was obtained in the same manner as in Example 8 except that the aqueous solution 2 was used in place of the aqueous solution 1. The mat material according to the present example was obtained by disposing the inorganic adhesive sheet on one surface of the main body.

Example 12

An inorganic adhesive sheet was obtained in the same manner as in Example 9 except that the aqueous solution 2 was used in place of the aqueous solution 1. The mat material according to the present example was obtained by disposing the inorganic adhesive sheet on one surface of the main body.

Example 13

An inorganic adhesive sheet was obtained in the same manner as in Example 1 except that the substrate c was used in place of the substrate a. However, because the substrate c was in the form of a net, the coating amount of the aqueous solution was 1.5 g (the solid content of the adhesive was about half that of Example 1). The mat material according to the present example was obtained by disposing the inorganic adhesive sheet on one surface of the main body.

Example 14

An inorganic adhesive sheet was obtained in the same manner as in Example 2 except that the substrate d was used in place of the substrate a. The mat material according to the present example was obtained by disposing the inorganic adhesive sheet on one surface of the main body.

Example 15

An inorganic adhesive sheet was obtained in the same manner as in Example 2 except that the substrate e was used in place of the substrate a. The mat material according to the present example was obtained by disposing the inorganic adhesive sheet on one surface of the main body.

Example 16

Into the inorganic adhesive sheet obtained in the same manner as in Example 2, cuts of 2 to 5 cm length (interval of 1 to 2 cm) were made in the short side direction of the sheet at intervals of 2 to 3 cm in the long side direction. The mat material according to the present example was obtained by disposing the inorganic adhesive sheet with the cuts formed on one surface of the main body.

Example 17

In the inorganic adhesive sheet obtained in the same manner as in Example 2, 2 cm square holes were regularly opened so that the opening ratio was 50%. The mat material according to the present example was obtained by disposing the inorganic adhesive sheet having the holes formed on one surface of the main body.

Example 18

An inorganic adhesive sheet was obtained in the same manner as in Example 1 except that the aqueous solution 3 was used in place of the aqueous solution 1. The mat material according to the present example was obtained by disposing the inorganic adhesive sheet on one surface of the main body.

Example 19

An inorganic adhesive sheet was obtained in the same manner as in Example 2 except that the aqueous solution 3 was used in place of the aqueous solution 1. The mat material according to the present example was obtained by disposing the inorganic adhesive sheet on one surface of the main body.

Example 20

An inorganic adhesive sheet was obtained in the same manner as in Example 3 except that the aqueous solution 3 was used in place of the aqueous solution 1. The mat material according to the present example was obtained by disposing the inorganic adhesive sheet on one surface of the main body.

Example 21

A paper liner (12 cm×40 cm) that had been subjected to water repellent treatment was fixed with a pressure-sensitive adhesive tape and placed on a flat table. On the surface, 1 g of a spray-type pressure-sensitive adhesive (Spray Glue 77, manufactured by 3M Japan Limited) was uniformly applied and dried. Furthermore, 6 g of the aqueous solution 1 was applied thereon by bar coating. The liner material coated with the pressure-sensitive adhesive and the aqueous solution was placed in an oven at a set temperature of 60° C. for 1 hour to dry the aqueous solution, thereby obtaining an inorganic adhesive sheet without a substrate. The mat material according to the present example was obtained by disposing the inorganic adhesive sheet on one surface of the main body. The surface of the main body and the inorganic adhesive sheet were fixed with a pressure-sensitive adhesive.

Comparative Example 1

The mat material according to the present comparative example was obtained by disposing the substrate a containing no inorganic adhesive on one surface of the main body.

Comparative Example 2

The mat material according to the present comparative example was obtained by disposing the substrate b not including the inorganic adhesive on one surface of the main body.

Comparative Example 3

Only the main body was used as the mat material according to the present comparative example.

Evaluation of Adhesive Strength

Figure 6:
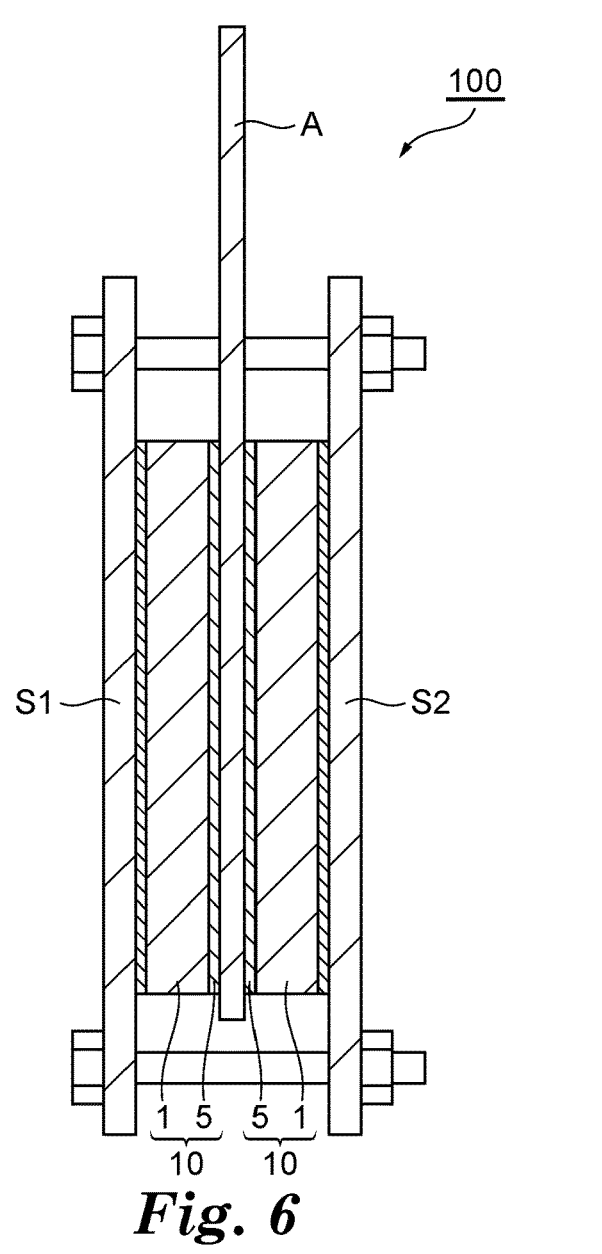
FIG. 6 is a schematic cross-sectional view illustrating a tool used for evaluating adhesive strength in examples, comparative examples, and reference examples.

To evaluate the adhesive strength of the mat material according to the above examples, comparative examples, and reference examples, a tool having the configuration illustrated in FIG. 6 was prepared. A tool 100 shown in this figure includes one alumina plate A (vertical 15 cm×lateral 5 cm×thickness 1 mm) and two stainless steel plates S1 and S2. The alumina plate A imitates a pollution control element (alumina support), and the stainless steel plates S1 and S2 imitate a casing. The spacing between the alumina plate A material was completely fixed to the stainless steel plates using an inorganic adhesive so as not to cause displacement between the mat material and the stainless steel plates.

Two samples having the configuration illustrated in FIG. 6 were prepared. One sample was allowed to stand at room temperature of 25° C. for 24 hours after preparation, and then the force required to pull out the alumina plate was measured. The other sample was sintered in an oven set at 600° C. for 24 hours, and then slowly cooled to room temperature. Thereafter, the force required to pull out the alumina plate was measured. A tensile tester (Autograph manufactured by SHIMADZU CORPORATION) was used to measure the force required to pull out the alumina plate, and the pulling speed of the alumina plate was 1 mm/minutes. The results are shown in Table 1.

TABLE 1

| | Inorganic adhesive | | | | Alumina plate pulling force [N/cm$^2$] | |
| | Type | Coating amount [g] | Cut Hole opening | Substrate | Before sintering | After sintering |
|---|---|---|---|---|---|---|
| Example 1 | Sodium silicate | 3 | — | Nonwoven fabric | 3.2 | 6.6 |
| Example 2 | Sodium silicate | 6 | — | Nonwoven fabric | 3.3 | 5.0 |
| Example 3 | Sodium silicate | 12 | — | Nonwoven fabric | 2.9 | 6.0 |
| Example 4 | Potassium silicate | 3 | — | Nonwoven fabric | 3.4 | 5.0 |
| Example 5 | Potassium silicate | 6 | — | Nonwoven fabric | 3.2 | 5.6 |
| Example 6 | Potassium silicate | 12 | — | Nonwoven fabric | 3.5 | 5.9 |
| Example 7 | Sodium silicate | 3 | — | Paper | 3.7 | 5.7 |
| Example 8 | Sodium silicate | 6 | — | Paper | 3.2 | 5.0 |
| Example 9 | Sodium silicate | 12 | — | Paper | 3.0 | 6.0 |
| Example 10 | Potassium silicate | 3 | — | Paper | 3.6 | 5.9 |
| Example 11 | Potassium silicate | 6 | — | Paper | 3.4 | 5.7 |
| Example 12 | Potassium silicate | 12 | — | Paper | 3.7 | 6.8 |
| Example 13 | Sodium silicate | (1.5) | — | Net | 3.0 | 6.8 |
| Example 14 | Sodium silicate | 6 | — | Woven fabric | 3.0 | 5.8 |
| Example 15 | Sodium silicate | 6 | Cut (improvement in softness) | Film | 2.5 | 4.7 |
| Example 16 | Sodium silicate | 6 | Square hole, opening ratio 50% | Nonwoven fabric | 3.4 | 5.1 |
| Example 17 | Sodium silicate | 6 | — | Nonwoven fabric | 2.8 | 5.3 |
| Example 18 | Aluminum phosphate | 3 | — | Nonwoven fabric | 5.6 | 5.7 |
| Example 19 | Aluminum phosphate | 6 | — | Nonwoven fabric | 5.3 | 5.8 |
| Example 20 | Aluminum phosphate | 12 | — | Nonwoven fabric | 5.5 | 5.5 |
| Example 21 | Aluminum phosphate | 6 | — | Not observed | 3.1 | 4.8 |
| Comparative Example 1 | — | — | — | Nonwoven fabric | 3.2 | 4.3 |
| Comparative Example 2 | — | — | — | Paper | 3.2 | 3.4 |
| Comparative Example 3 | — | — | — | — | 3.2 | 3.1 | and the stainless steel plate S1 is set to 4 mm by tightening a bolt. The spacing between the alumina plate A and the stainless steel plate S2 is the same as this.

Two mat materials (50 mm×50 mm) to be evaluated were prepared. As illustrated in FIG. 6, the mat materials were disposed on both sides of the alumina plate A so that the inorganic adhesive sheets of the two mat materials were in contact with the alumina plate A, respectively. The mat

INDUSTRIAL APPLICABILITY

The present disclosure provides a mat material having excellent holding power that is applied to a device or structure used in a heated environment, a method for manufacturing the mat material, an inorganic adhesive sheet, and a pollution control device.

REFERENCE SIGNS LIST 1 main body, 5 inorganic adhesive sheet, 5a substrate, 5b inorganic adhesive layer, 5c inorganic adhesive, 10 mat material, 20 casing, 30 pollution control element, 50 pollution control device, 60 thermal insulation structure, 61 first member, 61a surface of first member, 62 second member, 62a surface of second member

The invention claimed is:

1. A mat material comprising:
a mat-shaped main body comprising inorganic fibers and having a first surface and a second surface; and
an inorganic adhesive sheet that can be handled independently from the mat-shaped main body and is disposed on at least one surface of the first and second surfaces of the mat-shaped main body, and contains an inorganic adhesive that exhibits adhesiveness by heating, wherein the inorganic adhesive sheet further comprises a substrate supporting the inorganic adhesive.

2. The mat material according to claim 1, wherein the inorganic adhesive contains at least one type of salt selected from the group consisting of alkali metal salts, alkaline earth metal salts, and phosphate salts.

3. The mat material according to claim 2, wherein the alkali metal salt is an alkali metal silicate.

4. The mat material according to claim 3, wherein the alkali metal silicate is at least one type selected from the group consisting of sodium silicate, potassium silicate, and lithium silicate.

5. The mat material according to claim 2, wherein the phosphate salt is at least one type selected from the group consisting of aluminum phosphate, magnesium phosphate, and calcium phosphate.

6. The mat material according to claim 2, wherein a content of the salt in the inorganic adhesive sheet is from 2 to 100 $g/m^2$.

7. The mat material according to claim 1, wherein a mass per unit area of the substrate is from 1 to 200 $g/m^2$.

8. The mat material according to claim 1, wherein the substrate is a nonwoven fabric, paper, a woven fabric, or a resin film.

9. The mat material according to claim 1, wherein the substrate is a nonwoven fabric, paper, or a woven fabric, and the substrate is impregnated with the inorganic adhesive.

10. The mat material according to claim 1, wherein the substrate is net-shaped.

11. The mat material according to claim 1, wherein the mat-shaped main body and the inorganic adhesive sheet form a laminate where the inorganic adhesive sheet can be handled independently from the mat-shaped main body.

* * * * *